US012674048B2

(12) United States Patent
Williamson et al.

(10) Patent No.: US 12,674,048 B2
(45) Date of Patent: Jul. 7, 2026

(54) POLYOLEFIN COMPOSITIONS

(71) Applicants: Dow Global Technologies LLC,
Midland, MI (US); PBBPolisur S.R.L.,
Buenos Aires (AR)

(72) Inventors: Alexander Williamson, Rosharon, TX
(US); Shadid Askar, Houston, TX
(US); Joel D. Wieliczko, Charleston,
WV (US); Cornelis F.J. Den Doelder,
Terneuzen (NL); Mridula Kapur, Lake
Jackson, TX (US); Kurt F. Hirsekorn,
Sugar Land, TX (US); Evelyn
Auyeung, Houston, TX (US); Bo Liu,
Pearland, TX (US); Maria C.
Zandueta, Buenos Aires (AR); John P.
O'Brien, Manvel, TX (US); Stephanie
M. Whited, Charleston, WV (US)

(73) Assignees: Dow Global Technologies LLC,
Midland, MI (US); PBBPolisur S.R.L.,
Buenos Aires (AR)

( * ) Notice: Subject to any disclaimer, the term of this
patent is extended or adjusted under 35
U.S.C. 154(b) by 781 days.

(21) Appl. No.: 18/007,814

(22) PCT Filed: Jun. 4, 2021

(86) PCT No.: PCT/US2021/035832
§ 371 (c)(1),
(2) Date: Dec. 2, 2022

(87) PCT Pub. No.: WO2021/247957
PCT Pub. Date: Dec. 9, 2021

(65) Prior Publication Data
US 2023/0235156 A1       Jul. 27, 2023

Related U.S. Application Data

(60) Provisional application No. 63/034,484, filed on Jun.
4, 2020.

(51) Int. Cl.
C08L 23/0807       (2025.01)
C08L 23/06       (2006.01)

(52) U.S. Cl.
CPC ........... C08L 23/0815 (2013.01); C08L 23/06
(2013.01); *C08L 2205/025* (2013.01); *C08L*
*2314/02* (2013.01)

(58) Field of Classification Search
CPC .......... C08L 23/06; C08L 23/04; C08L 23/08;
C08L 23/0807; C08L 23/0815
See application file for complete search history.

(56) References Cited

U.S. PATENT DOCUMENTS

| | | | |
|---|---|---|---|
| 6,652,150 | B2 | 11/2003 | Buchheim et al. |
| 7,776,987 | B2 | 8/2010 | Oswald et al. |
| 7,812,095 | B2 | 10/2010 | Godon |
| 7,847,029 | B2 | 12/2010 | Butler et al. |
| 8,129,472 | B2 | 3/2012 | Turner et al. |
| 8,445,594 | B2 | 5/2013 | Michie, Jr. et al. |
| 10,759,927 | B1 | 9/2020 | Karjala et al. |
| 10,759,928 | B2 | 9/2020 | Brown et al. |
| 10,836,852 | B2 | 11/2020 | Karjala et al. |
| 11,098,183 | B2 | 8/2021 | Karjala et al. |
| 11,492,467 | B2 | 11/2022 | Lin et al. |
| 2005/0090464 | A1 | 4/2005 | Visser et al. |
| 2008/0221273 | A1 | 9/2008 | Michie, Jr. et al. |
| 2013/0137828 | A1* | 5/2013 | Michie, Jr. ............. C08L 23/26 525/240 |
| 2021/0147660 | A1 | 5/2021 | Tran et al. |

OTHER PUBLICATIONS

International Search Report & Written Opinion for related PCT
Application PCT/US2021/035832, mailed Sep. 17, 2021 (15 pgs).
International Preliminary Report on Patentability for related PCT
Application PCT/US2021/035832, mailed Dec. 15, 2022 (9 pgs).

* cited by examiner

*Primary Examiner* — Jeffrey S Lenihan

(57) ABSTRACT

Embodiments are directed towards polyolefin compositions
including a high molecular weight polyolefin and a low
molecular weight polyolefin.

9 Claims, No Drawings

POLYOLEFIN COMPOSITIONS

This application is a National Stage Application under 35 U.S.C. § 371 of International Application Number PCT/US2021/035832, filed Jun 4, 2021 and published as WO 2021/247957 on Dec 9, 2021, which claims the benefit to US. Provisional Application 63/034,484, filed Jun 4, 2020, the entire contents of which are incorporated herein by reference in its entirety

FIELD OF DISCLOSURE

Embodiments of the present disclosure are directed towards polyolefin compositions, more specifically, polyolefin compositions including a high molecular weight polyolefin and a low molecular weight polyolefin.

BACKGROUND

Different polymers are made utilizing various polymerization processes and/or different reaction components. For instance, different polymers are made utilizing solution, slurry, or gas phase polymerization processes. The various polymerization processes may utilize different catalysts, for example, Ziegler-Natta catalysts, chromium-based catalysts, metallocene catalysts, or combinations thereof. The different polymerization processes and different reaction components are utilized to make polymers having varying properties. There exists a continuing need for new polyolefin compositions.

SUMMARY

The present disclosure provides polyolefin compositions including a high molecular weight polyolefin having a density from 0.9200 to 0.9450 g/cm$^3$; and a low molecular weight polyolefin having an I$_2$ from 5 to 200 g/10 min, wherein the polyolefin composition provides a cumulative detector fraction (CDF$_{LS}$) at a molecular weight of ≥10,000,000 g/mol of greater than 0.085.

The present disclosure provides polyolefin compositions including a high molecular weight polyolefin; and a low molecular weight polyolefin, wherein the polyolefin composition has a density from 0.930 to 0.970 g/cm$^3$, a M$_w$/M$_n$ greater than 17, a melt index (I$_{21}$) from 15 to 40 g/10 min, and provides a G'/G" (0.02 s$^{-1}$) value that is greater than 0.3087+0.00404*(Eta at 0.02 s$^{-1}$)/(Eta at 200 s$^{-1}$)−0.224*HMW Split, and a G'(G"=3000 Pa) value from 1650 to 1870 Pa.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Polyolefin compositions are disclosed herein. The polyolefin compositions can provide a combination of properties that are desirable for a number of applications, such as blow-molding. Previous polymer compositions having a combination of properties that are desirable for blow-molding either have processability issues such as low swell, have poor ESCR (environmental stress crack) performance, or have manufacturability issues. As such, there is a need for the polyolefin compositions disclosed herein.

Advantageously the polyolefin compositions disclosed herein provide a combination of properties that are desirable for a number of applications. The polyolefin compositions provide a desirable extrudate swell, which may simply be referred to as swell, and a desirable environmental stress cracking resistance (ESCR). Additionally, the polyolefin compositions disclosed herein provide a desirable melt index.

The polyolefin compositions disclosed herein are made utilizing a plurality of gas-phase reactors, i.e. polymerization reactors, arranged in-series. For instance, the polyolefin compositions can be made utilizing a first fluidized bed reactor and a second fluidized bed reactor, where the first and second fluidized bed reactors are in-series. The polyolefin compositions are made from a high molecular weight polyolefin, which may also be referred to as a high molecular weight polyolefin polymer, and a low molecular weight polyolefin, which may also be referred to as a low molecular weight polyolefin polymer. As mentioned, the first fluidized bed reactor is gas-phase reactor arranged in-series, i.e. preceding, the second fluidized bed reactor. Gas-phase reactors are known and known components may be utilized for the first and second fluidized bed reactors. Embodiments of the present disclosure provide that the first fluidized bed reactor in-series is utilized to make a high molecular weight polyolefin, as compared to the second fluidized bed reactor in-series. The second fluidized bed reactor in-series is utilized to make a low molecular weight polyolefin.

As used herein an "olefin," which may be referred to as an "alkene," refers to a linear, branched, or cyclic compound including carbon and hydrogen and having at least one double bond. As used herein, when a polyolefin, polymer, and/or copolymer is referred to as comprising, e.g., being made from, an olefin, the olefin present in such polymer or copolymer is the polymerized form of the olefin. For example, when a copolymer is said to have an ethylene content of 75 wt % to 85 wt %, it is understood that the polymer unit in the copolymer is derived from ethylene in the polymerization reaction(s) and the derived units are present at 75 wt % to 85 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, butene, pentene, hexene, and 1-octene. Examples of polyolefins include ethylene-based polymers, having at least 50 wt % ethylene, including ethylene-1-butene, ethylene-1-hexene, and ethylene-1-octene copolymers, among others. One or more embodiments provide that the polymer can include from 50 to 99.9 wt % of units derived from ethylene based on a total weight of the polymer. All individual values and subranges from 50 to 99.9 wt % are included; for example, the polymer can include from a lower limit of 50, 60, 70, 80, or 90 wt % of units derived from ethylene to an upper limit of 99.9, 99.7, 99.4, 99, 96, 93, 90, or 85 wt % of units derived from ethylene based on the total weight of the polymer. The polymer can include from 0.1 to 50 wt % of units derived from comonomer based on the total weight of the polymer. One or more embodiments provide that ethylene is utilized as a monomer and hexene is utilized as a comonomer.

As mentioned, embodiments of the present disclosure provide that the first fluidized bed reactor in-series is utilized to make a high molecular weight polyolefin, as compared to the polyolefin made in the second fluidized bed reactor in-series.

The first fluidized bed reactor can have a reaction temperature from 70 to 95° C. All individual values and subranges from 70 to 95° C. are included; for example, the first fluidized bed reactor can have a reaction temperature from a lower limit of 70, 75, or 78° C. to an upper limit of 95, 90, or 88° C.

The first fluidized bed reactor can have an ethylene partial pressure from 20.0 to 55.0 pounds per square inch (psi). All individual values and subranges from 20.0 to 55.0 are included; for example, the first fluidized bed reactor can have an ethylene partial pressure from a lower limit of 20.0, 23.0, or 27.0 psi to an upper limit of 55.0, 50.0, or 45.0 psi.

One or more embodiments provide that ethylene is utilized as a monomer and hexene is utilized as a comonomer in the first fluidized bed reactor, i.e. the high molecular weight polyolefin is an ethylene hexene copolymer. One or more embodiments provide that the comonomer is hexene. The first fluidized bed reactor can have a comonomer to ethylene mole ratio, e.g., $C_6/C_2$, from 0.002 to 0.100. All individual values and subranges from 0.002 to 0.100 are included; for example, the first fluidized bed reactor can have a comonomer to ethylene mole ratio from a lower limit of 0.002, 0.003, or 0.004 to an upper limit of 0.100, 0.050, or 0.030.

The first fluidized bed reactor can have a hydrogen to ethylene mole ratio ($H_2/C_2$) from 0.01 to 1.00. All individual values and subranges from 0.01 to 1.00 are included; for example, the first fluidized bed reactor can have a $H_2/C_2$ from a lower limit of 0.01, 0.08, or 0.10 to an upper limit of 1.00, 0.50, or 0.20.

The first fluidized bed reactor can have an isopentane mole percent from 5.0 to 20.0 percent. All individual values and subranges from 5.0 to 20.0 percent are included; for example, the first fluidized bed reactor can have an isopentane mole percent from a lower limit of 5.0, 6.0, 7.0, 8.0 or 9.0 percent to an upper limit of 20.0, 18.0, 15.0, 13.0, or 11.0 percent.

As mentioned, embodiments of the present disclosure provide that the second fluidized bed reactor in-series is utilized to make a low molecular weight polyolefin. The second fluidized bed reactor can have a reaction temperature from 85 to 120° C. All individual values and subranges from 85 to 120° C. are included; for example, the second fluidized bed reactor can have a reaction temperature from a lower limit of 85, 90, or 95° C. to an upper limit of 120, 117, or 115° C.

The second fluidized bed reactor can have an ethylene partial pressure from 65.0 to 125.0 psi. All individual values and subranges from 65.0 to 125.0 are included; for example, the second fluidized bed reactor can have an ethylene partial pressure from a lower limit of 65.0, 68.0, or 70.0 psi to an upper limit of 125.0, 120.0, or 118.0 psi.

The second fluidized bed reactor can have a hydrogen to ethylene mole ratio ($H_2/C_2$) from 0.05 to 2.50. All individual values and subranges from 0.05 to 2.50 are included; for example, the second fluidized bed reactor can have a $H_2/C_2$ from a lower limit of 0.05, 0.06, or 0.08 to an upper limit of 2.50, 2.30, or 2.00.

The second fluidized bed reactor can have a comonomer to ethylene mole ratio, e.g., $C_6/C_2$, from 0.000 to 0.100. All individual values and subranges from 0.000 to 0.100 are included; for example, the second fluidized bed reactor can have a $H_2/C_2$ from a lower limit of 0.000, 0.002, or 0.004 to an upper limit of 0.100, 0.050, or 0.030. Comonomer may be fed to, e.g., added directly to, the second fluidized bed reactor and/or be carried over to the second fluidized bed reactor from the first fluidized bed reactor, e.g., residual comonomer. Comonomer added directly to the second fluidized bed reactor, which may be referred to as direct feed comonomer, is not considered residual comonomer, in contrast to comonomer that is carried over from the first fluidized bed reactor to the second fluidized bed reactor.

As mentioned, the polyolefin compositions are made from a high molecular weight polyolefin and a low molecular weight polyolefin.

The second fluidized bed reactor can have an isopentane mole percent from 1.0 to 20.0 percent. All individual values and subranges from 1.0 to 20.0 percent are included; for example, the second fluidized bed reactor can have an isopentane mole percent from a lower limit of 1.0, 2.0, 3.0, 4.0, 4.5 or 5.0 percent to an upper limit of 20.0, 18.0, 16.0, 15.0, 13.0, or 11.0 percent.

The high molecular weight polyolefin, which is made in the first fluidized bed reactor in-series with the second fluidized bed reactor, can have a density from 0.920 to 0.945 g/cm³. Density can be determined by according to ASTM D792. All individual values and subranges from 0.920 to 0.945 g/cm³ are included; for example, the high molecular weight polyolefin can have a density from a lower limit of 0.920, 0.925, 0.930, 0.936, or 0.937 g/cm³ to an upper limit of 0.945, 0.943, or 0.941 g/cm³.

The high molecular weight polyolefin can have a melt index ($I_{21}$) from 0.45 to 1.50 g/10 min. $I_{21}$ can be determined by according to ASTM D1238 (190° C., 21.6 kg). All individual values and subranges from 0.45 to 1.50 g/10 min are included; for example, the high molecular weight polyolefin can have an $I_{21}$ from a lower limit of 0.45, 0.50, or 0.55 g/10 min to an upper limit of 1.50, 1.30, or 1.15 g/10 min.

As mentioned, the low molecular weight polyolefin is made in the second fluidized bed reactor in-series with the first fluidized bed reactor. Embodiments of the present disclosure provide that the high molecular weight polyolefin that is made in the first fluidized bed reactor in-series is transferred into the second fluidized bed reactor in-series, and the low molecular weight polyolefin is made in the second fluidized bed reactor in-series in the presence of the transferred high molecular weight polyolefin. Embodiments of the present disclosure provide a method of making the polyolefin composition, the method comprising polymerizing with an olefin-polymerization catalyst ethylene and an alpha-olefin comonomer (e.g., 1-hexene) in a first fluidized bed reactor under first process conditions to make the high molecular weight polyolefin containing the olefin polymerization catalyst, transferring the high molecular weight polyolefin containing the olefin polymerization catalyst to a second fluidized bed reactor, which is in-series with the first fluidized bed reactor, and polymerizing ethylene in the second fluidized bed reactor under second process conditions so as to make the low molecular weight polyolefin, wherein the first process conditions in the first fluidized bed reactor are configured for making the high molecular weight polyolefin and the second process conditions in the second fluidized bed reactor are configured for making the low molecular weight polyolefin, thereby making the polyolefin composition. Density and $I_2$ values of the low molecular weight polyolefin can be obtained by making the low molecular weight polyolefin alone, i.e., in the absence of high molecular weight polyolefin, in a single reactor process under the same process conditions as used in the second fluidized bed reactor in-series. These same process conditions comprise reactor temperature, a molar ratio of hydrogen to ethylene ($H_2/C_2$ molar ratio), and a molar ratio of comonomer to ethylene ($C_x/C_2$ molar ratio), such as a molar ratio of 1-hexene to ethylene ($C_6/C_2$ molar ratio). In other words, the low molecular weight polyolefin can be characterized by making the polyolefin in isolation from the high molecular weight polyolefin. For instance, for determining density and $I_2$ values a polyolefin can be made in a single reactor under appropriate reactor conditions, which are then used when operating the second fluidized bed reactor in-series with the first fluidized bed reactor to make the low molecular weight polyolefin. Without being bound by theory it is believed that the low molecular weight polyolefin, made in the absence of the high molecular weight polyolefin under process conditions in the single reactor that are the same as the process conditions used to make the low molecular weight polyolefin in the presence of the high molecular weight polyolefin in the second fluidized bed reactor in-series, will have the same properties such as density and $I_2$ values as those of the low molecular weight polyolefin made in the second fluidized bed reactor in-series.

The low molecular weight polyolefin, which is made in the second fluidized bed reactor in-series with the first fluidized bed reactor, can have a density from 0.966 to 0.980 $g/cm^3$. Density can be determined by according to ASTM D792. All individual values and subranges from 0.950 to 0.980 $g/cm^3$ are included; for example, the low molecular weight polyolefin can have a density from a lower limit of 0.950, 0.955, 0.960, 0.965, 0.966, or 0.967 $g/cm^3$ to an upper limit of 0.980, 0.977, or 0.975 $g/cm^3$.

The low molecular weight polyolefin can have a melt index ($I_2$) from 15 to 200 g/10 min. $I_2$ can be determined by according to ASTM D1238 (190° C., 2.16 kg). All individual values and subranges from 15 to 200 g/10 min are included; for example, the low molecular weight polyolefin can have an $I_2$ from a lower limit of 15, 17, or 19 g/10 min to an upper limit of 200, 150, or 100 g/10 min.

The high molecular weight polyolefin having the $I_{21}$ from 0.45 to 1.50 g/10 min and the low molecular weight polyolefin having the $I_2$ from 15 to 200 g/10 min indicate that the polyolefin compositions disclosed herein are bimodal.

The polyolefin compositions disclosed herein may be referred to as blends, i.e. a blend of the high molecular weight polyolefin and the low molecular weight polyolefin. These blends are made in-situ; in other words, these blends are made with the first fluidized bed reactor and the second fluidized bed reactors; where the first and second fluidized bed reactors are in-series. The polyolefin compositions disclosed herein can have a high molecular weight split less than 50 percent. As used herein split refers to weight percent of high molecular weight component, i.e. the high molecular weight polyolefin. For instance, the polyolefin compositions disclosed herein can have a high molecular weight split from 30 to 49.5 percent. All individual values and subranges from 30 to 49.5 percent are included; for example the polyolefin compositions disclosed herein can have a high molecular weight split from a lower limit of 30, 35, or 38 percent to an upper limit of 49.5, 49.0, or 48.5 percent. As an example, if 60 polyolefin composition has a high molecular weight split of 35 percent, then that polyolefin composition includes 35 percent of the high molecular weight polyolefin and 65 percent of the low molecular weight polyolefin.

Embodiments of the polyolefin composition may have any one of limitations (i) to (vii): (i) wherein the polyolefin composition has a high molecular weight split of from 39 to 49 percent; (ii) wherein the high molecular weight polyolefin has a density from 0.937 to 0.941 $g/cm^3$; (iii) wherein the low molecular weight polyolefin has a melt index ($I_2$) from 16.5 to 129 g/10 min.; (iv) both limitation (i) and (ii); (v) both limitations (i) and (iii); (vi) both limitations (ii) and (iii); and (vii) each of limitations (i), (ii), and (iii).

The polyolefin compositions, i.e. the high molecular weight polyolefin and the low molecular weight polyolefin, disclosed herein are made with a Ziegler-Natta catalyst. Ziegler-Natta catalysts are known in the art and can refer to a catalyst system comprising a transition metal-containing solid catalyst compound, which may be referred to as a procatalyst; an organometallic compound, which may be referred to as a co-catalyst; and optionally one or more electron donor compounds, e.g., external electron donors. One or more embodiments provide that a Ziegler-Natta catalyst prepared according to U.S. Pat. No. 4,544,647 is utilized.

The high molecular weight polyolefin can be made with a Ziegler-Natta catalyst having an aluminum to titanium mole ratio from 5:1 to 15:1. All individual values and subranges from 5:1 to 15:1 are included; for example, the high molecular weight polyolefin can be made with a Ziegler-Natta catalyst having an aluminum to titanium mole ratio from a lower limit of 5:1, 6:1, or 7:1 to an upper limit of 15:1, 13:1, or 10:1.

The low molecular weight polyolefin can be made with a Ziegler-Natta catalyst having an aluminum to titanium mole ratio from 10:1 to 25:1. All individual values and subranges from 10:1 to 25:1 are included; for example, the low molecular weight polyolefin can be made with a Ziegler-Natta catalyst having an aluminum to titanium mole ratio from a lower limit of 10:1, 11:1, or 12:1 to an upper limit of 25:1, 20:1, or 18:1.

The polyolefin compositions disclosed herein, i.e. the blend of the high molecular weight polyolefin and the low molecular weight polyolefin, have a cumulative detector fraction ($CDF_{LS}$) at a molecular weight (MW) of $\geq 10,000,000$ g/mol of greater than 0.085. One or more embodiments provide that the $CDF_{LS}$ is greater than 0.089 or greater than 0.10. The $CDF_{LS}$ of greater than 0.085 indicates a particular very high molecular weight fraction, i.e., a substantial very high molecular weight fraction, or tail (HMW fraction or HMW tail). While not wishing to be bound to theory, it is believed that this high molecular weight tail help contribute to an improved swell as compared to other resins, e.g. bimodal resins. $CDF_{LS}$ can be determined via Low-Angle Laser Light Scattering (LALLS). $CDF_{LS}$ can be determined as follows.

A chromatographic system can be utilized. The chromatographic system can include a PolymerChar GPC-IR (Valencia, Spain) high temperature GPC chromatograph equipped with an internal IR5 infra-red detector (IR5) and 4-capillary viscometer (DV) coupled to a Agilent Technologies 2-angle laser light scattering (LS) detector Model 2040. For all the Light scattering measurements, the 15 degree angle can be used. The autosampler oven compartment can ve set at 165° C. and the column compartment can be set at 155° C. The columns can be 4 TSKgel $GMHH_{HR}$-H(30) HT2 (TOSOH 7.8 mmx 30 cm, 30 um particle size). The chromatographic solvent can be 1,2,4 trichlorobenzene and can contain 200 ppm of butylated hydroxytoluene (BHT). The solvent source can be nitrogen sparged. The injection volume can be 200 microliters and the flow rate can be 1.0 milliliters/minute. Determination of multi-detector offsets can be consistent with the publication by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard ($M_w/M_n$>2.7) to the narrow standard column calibration results from the narrow standards calibration curve using PolymerChar GPCOne Software. As used herein, "MW" refers to molecular weight. Absolute molecular weight data can be obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne software. The concentration at each elution volume can be assumed to be infinitive diluted, therefore no 2nd virial correction is used. Only 15 degree is used without any correction from form factor. The overall injected concentration, used in the determination of the molecular weight, can be obtained from the mass detector area and the mass detector constant, derived from a suitable linear polyethylene homopolymer, or one of the polyethylene standards of known weight-average molecular weight, e.g. homopolymer polyethylene. The calculated molecular weights (using GPCOne) can be obtained using a light scattering constant, derived from one or more of the polyethylene standards mentioned below, and a refractive index concentration coefficient, dn/dc, of 0.104. The mass detector response (IR5) and the light scattering constant (determined using GPCOne) can be determined from homopolymer polymer polyethylene standard with MW of 120,000 g/mol. The viscometer calibration (with GPCOne) can be performed using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne) can be calculated which relates specific viscosity area (DV) and injected mass for the calibration standard to its intrinsic viscosity (IV). The chromatographic concentrations can be assumed low enough to eliminate addressing 2nd viral coefficient effects (concentration effects on molecular weight). The absolute weight average molecular weight ($M_w$(Abs)) can be obtained (using GPCOne) from the area of the Light Scattering (LS) integrated chromatogram (factored by the light scattering constant) divided by the mass recovered from the mass constant and the mass detector (IR5) area at each elution volume. The molecular weight and intrinsic viscosity responses can be extrapolated at chromatographic ends where signal to noise becomes low (using GPCOne). Other respective moments, $M_n$(Abs) and $M_z$(Abs) can be calculated according to the equation follows:

$$Mn_{(Abs)} = \frac{\sum\limits^i IR_i}{\sum\limits^i (IR_i/M_{Absolute_i})} \qquad \text{Equation 1}$$

$$Mz_{(Abs)} = \frac{\sum\limits^i (IR_i * M^2_{Absolute_i})}{\sum\limits^i (IR_i * M_{Absolute_i})} \qquad \text{Equation 2}$$

The polyethylene equivalent molecular weight distribution, which can be referred to as conventional GPC, can measured with the exact same instrumentation and same columns at same experimental conditions. Calibration of the GPC column set can be performed with 21 narrow molecular weight distribution polystyrene standards (available from Agilent Technologies) with molecular weights ranging from 580 g/mol to 8,400,000 g/mol and were arranged in 6 "cocktail" mixtures with at least a decade of separation between individual molecular weights. The polystyrene standards can be prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards can be dissolved at 80° C. with gentle agitation for 30 minutes. The polystyrene standard peak molecular weights can be converted to polyethylene molecular weights using the following equation (as described in Williams and Ward, J. Polym. Sci., Polym. Let., 6, 621 (1968)):

$$MW_{polyethylene} = A \times (Mw_{polystyrene})^B \qquad \text{Equation 3}$$

where MW is the molecular weight, A has a value of 0.4315 and B is equal to 1.0. A fifth order polynomial can be used to fit the respective polyethylene-equivalent calibration points. A small adjustment to A (from approximately 0.3950 to 0.440) can be made to correct for column resolution change over column usage such that linear homopolymer polyethylene standard is obtained at 120,000 MW. The total plate count of the GPC column set can be performed with decane (prepared at 0.04 g in 50 milliliters of TCB.) The plate count (Equation 4) and symmetry (Equation 5) can measured on a 200 microliter injection according to the following equations:

$$\text{Plate Count} = 5.54 * \left( \frac{RV_{Peak\,Max}}{\text{Peak Width at } \frac{1}{2} \text{ height}} \right)^2 \qquad \text{Equation 4}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \qquad \text{Equation 5}$$

where RV is the retention volume in milliliters and the peak width is in milliliters, Peak max is the maximum position of the peak, one tenth height is $\frac{1}{10}$ height of the peak maximum, and where rear peak refers to the peak tail at later retention volumes than the peak max and where front peak refers to the peak front at earlier retention volumes than the peak max. The plate count for the chromatographic system should be greater than 15,000 and symmetry should be between 0.98 and 1.22. Samples can be prepared in a semi-automatic manner with the PolymerChar "Instrument Control" Software, wherein the samples are weight-targeted at 1 mg/ml, and the solvent (contained 200 ppm BHT) is added to a pre nitrogen-sparged septum-capped vial, via the PolymerChar high temperature autosampler. The samples can be dissolved for 3 hours at 165° C. under "low speed" shaking. The calculations of Mn(Conv), Mw(Conv), and Mz(Conv) can be based on GPC results using the internal IR5 detector (measurement channel) of the PolymerChar GPC-IR chromatograph according to Equations 6-8, using PolymerChar GPCOnesoftware, the baseline-subtracted IR chromatogram at each equally-spaced data collection point (i), and the polyethylene equivalent molecular weight obtained from the narrow standard calibration curve for the point (i) from Equation 1.

$$Mn(conv) = \frac{\Sigma^{i} IR_i}{\Sigma^{i}\left(IR_i/M_{polyethylene_i}\right)} \qquad \text{Equation 6}$$

$$Mw(conv) = \frac{\Sigma^{i}\left(IR_i * M_{polyethylene_i}\right)}{\Sigma^{i} IR_i} \qquad \text{Equation 7}$$

$$Mz(conv) = \frac{\Sigma^{i}\left(IR_i * M_{polyethylene_i}^2\right)}{\Sigma^{i}\left(IR_i * M_{polyethylene_i}\right)} \qquad \text{Equation 8}$$

In the low molecular weight region of the GPC elution curve, when the presence of a significant peak that is known to be caused by the presence of anti-oxidant or other additives, the presence of such peak can cause an underestimation of the number average molecular weight (Mn) of the polymer sample to give an overestimation of the sample polydispersity defined as Mw/Mn, where Mw is the weight average molecular weight. The true polymer sample molecular weight distribution can therefore be calculated from the GPC elution by excluding this extra peak when present. This process can be described as the peak skim feature in data processing procedures in liquid chromatographic analyses. In this process, this additive peak is skimmed off from the GPC elution curve before the sample molecular weight calculation is performed from the GPC elution curve. In order to monitor pump performance over time, a flowrate marker (decane) can be introduced into each sample via a micropump controlled with the PolymerChar GPC-IR system. This flowrate marker (FM) can be used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). The first derivative of the quadratic equation can then be used to solve for the true peak position. After calibrating the system based on a flow marker peak, the effective flowrate (with respect to the narrow standards calibration) can be calculated as Equation 9. Processing of the flow marker peak can be done via the PolymerChar GPCOne Software. Acceptable flowrate correction can be such that the effective flowrate should be within +/−0.5% of the nominal flowrate.

$$\text{Flowrate(effective)=Flowrate(nominal)*(RV(FM Calibrated)/RV(FM Sample))} \qquad \text{Equation 9}$$

Calculation of the cumulative detector fractions (CDF) for the low angle laser light scattering detector ("CDF$_{LS}$") can accomplished as follows. 1) Linearly flow correct the chromatogram based on the relative retention volume ratio of the air peak between the sample and that of a consistent narrow standards cocktail mixture. 2) Correct the light scattering detector offset (effective offset) relative to the IR5 as previously described. 3) Calculate the molecular weights at each retention volume (RV) data slice based on the polystyrene calibration curve, modified by the polystyrene to polyethylene conversion factor of approximately (0.395-0.440) as previously described. 4) Subtract baselines from the light scattering and IR5 chromatograms and set integration windows using standard GPC practices making certain to integrate all of the low molecular weight retention volume range in the light scattering chromatogram that is observable from the IR5 chromatogram (thus setting the highest RV limit to the same index in each chromatogram). Do not include any material in the integration which corresponds to less than 150 Dalton in either chromatogram. 5) Calculate the cumulative detector fraction (CDF$_{LS}$) of the Low-Angle Laser Light Scattering (LALLS) chromatogram (CDF$_{LS}$)

based on its baseline-subtracted peak height (H) from high to low molecular weight (low to high retention volume) at each data slice (i) according to the following equation:

$$CDF_{LS \geq 10,000,000 MW} = \frac{\Sigma_{j=RV\ at\ Lowest\ Integrated\ Volume}^{j=RV\ at\ 10,000,000\ MW} Hj}{\Sigma_{j=RV\ at\ Lowest\ Integrated\ Volume}^{j=RV\ at\ Highest\ Integrated\ Volume} Hj} \qquad \text{Equation 10}$$

The polyolefin compositions disclosed herein have a density from 0.930 to 0.970 g/cm$^3$. All individual values and subranges from 0.930 to 0.980 g/cm$^3$ are included; for example, the polyolefin composition can have a density from a lower limit of 0.930, 0.935, or 0.940 g/cm$^3$ to an upper limit of 0.970, 0.968, or 0.965 g/cm$^3$.

The polyolefin compositions disclosed herein have a melt index (I$_2$) from 0.03 to 0.50 g/10 min. All individual values and subranges from 0.03 to 0.50 g/10 min are included; for example, the polyolefin composition can have an I$_2$ from a lower limit of 0.03, 0.05, or 0.10 g/10 min to an upper limit of 0.50, 0.40, or 0.30 g/10 min.

The polyolefin compositions disclosed herein have a melt index (I$_5$) from 0.3 to 2.0 g/10 min. All individual values and subranges from 0.3 to 2.0 g/10 min are included; for example, the polyolefin composition can have an I$_5$ from a lower limit of 0.3, 0.5, or 0.7 g/10 min to an upper limit of 2.0, 1.7, or 1.5 g/10 min.

The polyolefin compositions disclosed herein have a melt index (I$_{21}$) from 15 to 40 g/10 min. All individual values and subranges from 15 to 40 g/10 min are included; for example, the polyolefin composition can have an I$_{21}$ from a lower limit of 15, 16, 17, or 18 g/10 min to an upper limit of 40, 35, or 30 g/10 min.

The polyolefin compositions disclosed herein can have a I$_{21}$ to I$_5$ ratio (I$_{21}$/I$_5$) greater than 22. For instance, the polyolefin composition herein can have an I$_{21}$/I$_5$ from 22 to 35. All individual values and subranges from 22 to 35 are included; for example, the polyolefin composition can have an I$_{21}$/I$_5$ from a lower limit of 22.1, 22.3, or 22.5 to an upper limit of 35, 33, or 30.

The polyolefin compositions disclosed herein can have a weight average molecular weight (M$_w$(Conv)) from 175,000 to 350,000 g/mol. As used herein M$_w$(Conv) may be more simply referred to as M. All individual values and subranges from 175,000 to 350,000 g/mol are included; for example, the polyolefin composition can have an M$_w$ from a lower limit of 175,000, 200,000, or 225,000 g/mol to an upper limit of 350,000, 325,000, or 300,000 g/mol. M$_w$ can be determined by conventional gel permeation chromatography (GPC), as is known in the art. Conventional GPC is discussed herein.

The polyolefin compositions disclosed herein can have an absolute weight average molecular weight (M$_w$(Abs)) from 350,000 to 800,000 g/mol. All individual values and subranges from 350,000 to 800,000 g/mol are included; for example, the polyolefin composition can have an M$_w$(Abs) from a lower limit of 350,000, 450,000, or 500,000 g/mol to an upper limit of 800,000, 750,000, or 700,000 g/mol. M$_w$(Abs) can be determined by absolute gel permeation chromatography (GPC), as is known in the art. Absolute GPC is discussed herein.

The polyolefin compositions disclosed herein can have a number average molecular weight (M$_n$(Conv)) from 8,000 to 25,000 g/mol. As used herein M$_n$(Conv) may be more simply referred to as M$_n$. All individual values and subranges from 8,000 to 25,000 g/mol are included; for example, the polyolefin composition can have an M$_n$ from a lower limit of 8,000, 9,000, or 10,000 g/mol to an upper limit of 25,000, 20,000, or 16,000 g/mol. $M_n$ can be determined by conventional gel permeation chromatography (GPC), as is known in the art. Conventional GPC is discussed herein.

The polyolefin compositions disclosed herein can have an absolute number average molecular weight ($M_n$(Abs)) from 8,000 to 25,000 g/mol. All individual values and subranges from 8,000 to 25,000 g/mol are included; for example, the polyolefin composition can have an $M_n$(Abs) from a lower limit of 8,000, 9,000, or 10,000 g/mol to an upper limit of 25,000, 20,000, or 16,000 g/mol. Mn(Abs) can be determined by absolute gel permeation chromatography (GPC), as is known in the art. Absolute GPC is discussed herein.

The polyolefin compositions disclosed herein can have a Z-average molecular weight ($M_z$(Conv)) from 1,500,000 to 5,500,000 g/mol. As used herein $M_z$(Conv) may be more simply referred to as M. All individual values and subranges from 1,500,000 to 5,500,000 g/mol are included; for example, the polyolefin composition can have an $M_z$ from a lower limit of U.S. Pat. Nos. 1,500,000, 1,750,000, or 2,250,000 g/mol to an upper limit of 5,500,000, 5,000,000, or 4,250,000 g/mol. $M_z$ can be determined by conventional gel permeation chromatography (GPC), as is known in the art. Conventional GPC is discussed herein.

The polyolefin compositions disclosed herein can have an absolute Z-average molecular weight ($M_z$(Abs)) from 3,500,000 to 12,000,000 g/mol. All individual values and subranges from 3,500,000 to 12,000,000 g/mol are included; for example, the polyolefin composition can have an $M_z$(Abs) from a lower limit of U.S. Pat. Nos. 3,500,000, 4,500,000, or 5,000,000 g/mol to an upper limit of 12,000,000, 11,000,000, 10,000,000, 8,000,000, or 6,000,000 g/mol. $M_z$(Abs) can be determined by absolute gel permeation chromatography (GPC), as is known in the art. Absolute GPC is discussed herein.

The polyolefin compositions disclosed herein can have weight average molecular weight to number average molecular weight ratio ($M_w/M_n$) greater than 17. For instance, the polyolefin composition herein can have an $M_w/M_n$ from 17 to 30. All individual values and subranges from 17 to 30 are included; for example, the polyolefin composition can have an $M_w/M_n$ from a lower limit of 17, 17.5, or 17.9 to an upper limit of 30, 28, 26, 24, 22, or 20.

For the polyolefin compositions disclosed herein, storage modulus (G'), loss modulus (G") and complex viscosity (eta or q) can be determined as follows. For preparation, test samples can be placed into a 1.5 in. diameter chase of thickness 3.10 mm and be compression molded at a pressure of 2500 lbs for 6.5 min. at 190° C. Then after cooling to room temperature, the sample can be extracted to await rheological testing. A DMS (dynamic mechanical spectroscopy) frequency sweep can be conducted using 25 mm parallel plates at frequencies ranging from 0.02 to 200 rad/s. Test gap separating the plates can be 2 mm and a 10% strain that satisfies linear viscoelastic conditions can be utilized; each test can be conducted under isothermal conditions at 190° C. Prior to initiating the DMS test, the rheometer oven can be allowed to equilibrate at the testing temperature for at least 30 min. After the testing temperature has equilibrated, the sample can be loaded into the rheometer, and the plates can be gradually reduced to a gap of 2.8 mm and trimmed. The sample can then be allowed to equilibrate for 2.5 min. before reducing the parallel plates to a final test gap of 2 mm. Lastly, the sample can be trimmed again to ensure that no bulge is present, and the test can be initiated under a nitrogen blanket to help ensure thermal stability. During the test, the shear elastic modulus (G'), viscous modulus (G") and complex viscosity can be measured. All DMS frequency tests can be conducted on ARES-G2 rheometer (manufactured by TA Instruments). Data analyses can be conducted via TA Instruments TRIOS software.

The polyolefin compositions disclosed herein can provide a G'(G"=3000 Pa) value from 1650 to 1870 Pa. All individual values and subranges from 1650 to 1870 Pa are included; for example, the polyolefin composition can provide a G'(G"=3000 Pa) value from a lower limit of 1650, 1660, or 1670 Pa to an upper limit of 1870, 1860, or 1850 Pa.

The polyolefin compositions disclosed herein can desirably provide a G'/G" (0.02 s$^{-1}$) value that is greater than the following Equation 1:

$$0.3087+0.00404*(\text{Eta at } 0.02 \text{ s}^{-1})/(\text{Eta at } 200 \text{ s}^{-1})- 0.224*\text{HMW Split}$$

The polyolefin compositions disclosed herein can desirably provide a G' (G"=3000 Pa) value that is greater than the following Equation 2:

$$1242.6+17.5*(I_{21}/I_5)-5.6*I_{21}$$

A surprisingly high G'/G" (0.02 s$^{-1}$) was observed for the polyolefin compositions disclosed herein (as characterized by (Eta at 0.02 s$^{-1}$)/(Eta at 200 s$^{-1}$) as one MWD-related metric and by HMS split as another MWD-related metric). Such higher G'/G" is associated with greater elasticity and can lead to higher swell and higher melt strength.

The polyolefin compositions disclosed herein can desirably provide a melt strength from 6.5 to 12.0 cN. All individual values and subranges from 16.5 to 12.0 cN are included; for example, the polyolefin composition can provide a melt strength from a lower limit of 6.5, 7.0, or 7.5 cN to an upper limit of 12.0, 11.0, or 10.0 cN. Melt strength can be determined as follows. Melt Strength (MS) measurements can utilize a Gottfert Rheotens 71.97 (Gottfert Inc.; Rock Hill, S.C.) attached to a Gottfert Rheotester 2000 capillary rheometer. A polymer melt (about 20-30 grams, pellets) can be extruded through a capillary die with a flat entrance angle (180 degrees) with a capillary diameter of 2.0 mm and an aspect ratio (capillary length/capillary diameter) of 15. After equilibrating the samples at 190° C. for 10 minutes, the piston can be run at a constant piston speed of 0.265 mm/second. The standard test temperature is 190° C. The sample can be drawn uniaxially to a set of accelerating nips located 100 mm below the die, with an acceleration of 2.4 mm/second$^2$. The tensile force can be recorded as a function of the take-up speed of the nip rolls. Melt strength is reported as the plateau force (cN) before the strand broke. The following conditions can be used in the melt strength measurements: plunger speed is 0.265 mm/second; wheel acceleration is 2.4 mm/s$^2$; capillary diameter is 2.0 mm; capillary length is 30 mm; and barrel diameter is 12 mm.

The polyolefin compositions disclosed herein can desirably provide a top load greater than 200 grams. For instance, the polyolefin compositions disclosed herein can provide a top load from 201 to 375 grams. All individual values and subranges from 201 to 375 grams are included; for example, the polyolefin compositions disclosed herein can provide a top load from lower limit of 201, 210, or 220 grams to an upper limit of 375, 350, or 325 grams. Top load can be determined as is known to those in the art.

The polyolefin compositions disclosed herein can desirably provide a swell at a shear rate of 1000 s$^{-1}$ (t1000) greater than 6.5 seconds. For instance, the polyolefin composition herein can provide a swell (t1000) from greater than 6.5 seconds, e.g. 6.51 seconds, to 10.0 seconds. All individual values and subranges from 6.51 to 10.00 seconds are included; for example, the polyolefin composition can provide a swell (t1000) from a lower limit of 6.51, 6.53, or 6.55 seconds to an upper limit of 10.0, 9.0, or 8.0 seconds.

The polyolefin compositions disclosed herein can desirably provide a swell at a shear rate of 300 s$^{-1}$ (t300) greater than 17.0 seconds. For instance, the polyolefin composition herein can provide a swell (t300) from 17.0 to 25.0 seconds. All individual values and subranges from 17.0 to 25.0 seconds are included; for example, the polyolefin composition can provide a swell (t300) from a lower limit of 17.0, 17.5, or 18.0 seconds to an upper limit of 25.0, 22.0, or 21.0 seconds.

Swell can be determined as follows. A strand of polymer can be produced by a piston-driven capillary rheometer (Göttfert Rheograph 2003 equipped with a 12 mm diameter barrel and a 1 mm diameter circular die of length 10 mm, with a 90° entrance angle) at shear rates of either 300 s$^{-1}$ or 1000 s$^{-1}$ and at a temperature of 190° C. The volumetric flow rate is kept constant. The strand can be cut at a distance of 4 cm from the die exit, and the timer started. When the strand reached a total length of 27 cm (namely an incremental length of 23 cm after the timer started), the timer is stopped. High swell materials produced thicker extrudate whose length grows more slowly than that of lower swell materials. The recorded time for the strand to reach the incremental length of 23 cm relates to the extrudate swell. The measurement is repeated five times, to account for measurement variability, and the average result is reported. The extrudate swell is herein reported as the time required for the extrudate to cover the distance of 23 cm when extruded at a shear rate of 1000 s$^{-1}$ (t1000) and at a shear rate of 300 s$^{-1}$ (t300).

The polyolefin compositions disclosed herein can desirably provide an ESCR $F_{50}$ greater than 140 hours. For instance, the polyolefin composition herein can provide an ESCR $F_{50}$ from 140.5 to 550 hours. All individual values and subranges from 140 to 550 hours are included; for example, the polyolefin composition can provide an ESCR $F_{50}$ from a lower limit of 140.5 or 141 hours to an upper limit of 550, 500, or 450 hours. ESCR $F_{50}$ can be determined according to by ASTM D-1693, Method B, in 10% by volume aqueous Igepal CO-630 solution.

The polyolefin compositions disclosed herein may be utilized for a number of applications including, but not limited to, molded articles, extruded articles, films, fibers, nonwoven fabrics and/or woven fabrics. The polyolefin compositions disclosed herein may be particularly advantageous for blow molding applications, e.g., in making bottles, tanks, hollow articles, rigid food containers and toys, among other molded articles.

A number of aspects of the present disclosure are provided as follows.

Aspect 1 provides a polyolefin composition comprising: a high molecular weight polyolefin having a density from 0.920 to 0.945 g/cm$^3$; and a low molecular weight polyolefin having an $I_2$ from 5 to 200 g/10 min, wherein the polyolefin composition provides a cumulative detector fraction (CD-$F_{LS}$) at a molecular weight of ≥10,000,000 g/mol of greater than 0.085.

Aspect 2 provides the polyolefin composition of Aspect 1, wherein the high molecular weight polyolefin is an ethylene/1-hexene copolymer that has a high load melt index ($I_{21}$) from 0.45 to 1.50 g/10 min. and wherein the low molecular weight polyolefin is a polyethylene homopolymer.

Aspect 3 provides the polyolefin composition of Aspect 1 and/or Aspect 2, wherein the polyolefin composition provides an Environmental Stress Crack Resistance $F_{50}$ Condition B (10% IGEPAL) greater than 140 hours.

Aspect 4 provides the polyolefin composition of Aspect 1, Aspect 2, and/or Aspect 3, wherein the polyolefin composition provides a swell (t1000) greater than 6.5 seconds.

Aspect 5 provides the polyolefin composition of Aspect 1, Aspect 2, Aspect 3, and/or Aspect 4, wherein the polyolefin composition has a density from 0.930 to 0.970 g/cm$^3$, a $M_w/M_n$ greater than 17, a melt index ($I_{21}$) from 15 to 40 g/10 min, and provides a G'/G" (0.02 s$^{-1}$) value that is greater than 0.3087+0.00404*(Eta at 0.02 s$^{-1}$)/(Eta at 200 s$^{-1}$)−0.224*HMW Split, and a G'(G"=3000 Pa) value from 1650 to 1870 Pa.

Aspect 6 provides a polyolefin composition comprising: a high molecular weight polyolefin; and a low molecular weight polyolefin, wherein the polyolefin composition has a density from 0.930 to 0.970 g/cm$^3$, a $M_w/M_n$ greater than 17, a melt index ($I_{21}$) from 15 to 40 g/10 min, and provides a G'/G" (0.02 s$^{-1}$) value that is greater than 0.3087+0.00404* (Eta at 0.02 s$^{-1}$)/(Eta at 200 s$^{-1}$)−0.224*HMW Split, and a G'(G"=3000 Pa) value from 1650 to 1870 Pa.

Aspect 7 provides the polyolefin composition of Aspect 6, wherein the polyolefin composition provides a G'(G"=3000 Pa) value that is greater than 1242.6+17.5*($I_{21}/I_5$)−5.6*$I_{21}$.

Aspect 8 provides the polyolefin composition of Aspect 1, Aspect 2, Aspect 3, Aspect 4, Aspect 5, Aspect 6, and/or Aspect 7 wherein, wherein the polyolefin composition has a high molecular weight split less than 50 percent.

Aspect 9 provides the polyolefin composition of Aspect 1, Aspect 2, Aspect 3, Aspect 4, Aspect 5, Aspect 6, Aspect 7, and/or Aspect 8, wherein the polyolefin composition provides a melt strength from 6.5 to 12.0 cN.

Aspect 10 provides the polyolefin composition of Aspect 1, Aspect 2, Aspect 3, Aspect 4, Aspect 5, Aspect 6, Aspect 7, Aspect 8, and/or Aspect 9, wherein the polyolefin composition provides a top load greater than 200 grams; or wherein the polyolefin composition provides a top load less than 279 grams; or both.

Aspect 11 provides the polyolefin composition of Aspect 1, Aspect 2, Aspect 3, Aspect 4, Aspect 5, Aspect 6, Aspect 7, Aspect 8, Aspect 9, and/or Aspect 10, wherein the polyolefin composition has an absolute Z-average molecular weight ($M_z$(Abs)) from 3,500,000 to 12,000,000 g/mol or wherein the polyolefin composition has an absolute weight average molecular weight ($M_w$(Abs)) from 350,000 to 800,000 g/mol; or both.

Aspect 12 provides the polyolefin composition of Aspect 1, Aspect 2, Aspect 3, Aspect 4, Aspect 5, Aspect 6, Aspect 7, Aspect 8, Aspect 9, Aspect 10, and/or Aspect 11, wherein the polyolefin composition has weight Z-average molecular weight ($M_z$) from 1,500,000 to 5,500,000 g/mol.

Aspect 13 provides the polyolefin composition of Aspect 1, Aspect 2, Aspect 3, Aspect 4, Aspect 5, Aspect 6, Aspect 7, Aspect 8, Aspect 9, Aspect 10, Aspect 11, and/or Aspect 12, wherein the polyolefin composition provides a cumulative detector fraction (CDF$_L$s) at a molecular weight of ≥10,000,000 g/mol of greater than 0.10; or wherein the polyolefin composition provides a cumulative detector fraction (CDF$_{LS}$) at a molecular weight of ≥10,000,000 g/mol of less than 0.140; or both.

Aspect 14 provides the polyolefin composition of Aspect 1, Aspect 2, Aspect 3, Aspect 4, Aspect 5, Aspect 6, Aspect 7, Aspect 8, Aspect 9, Aspect 10, Aspect 11, Aspect 12, and/or Aspect 13, having any one of limitations (i) to (vii): (i) wherein the polyolefin composition has a high molecular weight split of from 39 to 49 percent; (ii) wherein the high molecular weight polyolefin has a density from 0.937 to 0.941 g/cm$^3$; (iii) wherein the low molecular weight polyolefin has a melt index (I$_2$) from 16.5 to 129 g/10 min.; (iv) both limitation (i) and (ii); (v) both limitations (i) and (iii); (vi) both limitations (ii) and (iii); and (vii) each of limitations (i), (ii), and (iii).

Aspect 15 provides a method of making the polyolefin composition of any one of the preceding Aspects, the method comprising polymerizing with a Ziegler-Natta catalyst ethylene and 1-hexene in a first fluidized bed reactor under first process conditions to make the high molecular weight polyolefin containing the olefin polymerization catalyst, transferring the high molecular weight polyolefin containing the olefin polymerization catalyst to a second fluidized bed reactor, which is in-series with the first fluidized bed reactor, and polymerizing ethylene in the second fluidized bed reactor under second process conditions so as to make the low molecular weight polyolefin, wherein the first process conditions in the first fluidized bed reactor are configured for making the high molecular weight polyolefin and the second process conditions in the second fluidized bed reactor are configured for making the low molecular weight polyolefin, thereby making the polyolefin composition.

EXAMPLES

Polymerization catalyst-1, a Ziegler-Natta catalyst, was prepared, as described in U.S. Pat. No. 4,526,942, as follows. Dibutylmagnesium (solution in a heptanehexane; obtained from the Lithium Corporation of America); dihexylmagnesium (solution in a hexane; obtained from Ethyl Corporation or Texas Alkyls, Inc); and butylethylmagnesium (solution in a hexane; obtained from Texas Alkyls, Inc); triisobutylaluminum (solution in a hexane; 0.616 molar; obtained from Ethyl Corporation or Texas Alkyls, Inc); and ethylaluminum dichloride (solution in a hexane; 1.53 molar; obtained from Ethyl Corporation or Texas Alkyls, Inc) were utilized.

A masterbatch solution was prepared by mixing butylethylmagnesium (391.5 ml of 0.637 M; 250 mmoles) and triisobutylaluminum (202.9 ml of 0.616 M; 125 mmoles). Then neat n-propylalcohol (65.4 ml; 875 mmoles) was added dropwise to maintain the temperature at approximately 40° C. Then, the solution was diluted volumetrically with hexane to 750 ml. Concentration of magnesium in this masterbatch solution was 0.3333 M. The ratio of ROH:R groups, i.e., added ROH to R groups attached to magnesium and aluminum in component A, was 1:1. Then, tetraisopropoxytitanium (1.5 ml, 5.04 mmoles) was added dropwise the masterbatch solution (75 mi aliquot; containing 25 mmoles of magnesium). Then ethylaluminum dichloride (65.5 mi: 100.22 mmoles) was added dropwise at approximately 22° C. A brown slurry resulted after complete addition of the ethylaluminum dichloride to provide Polymerization catalyst-1; the catalyst volume was adjusted to 200 ml and fresh hexane and a 50 ml aliquot set aside for polymerization. The Mg:Ti and Cl:Mg atomic ratios for Polymerization catalyst-1 were 4,96:1 and 8.02:1 respectively.

Example 1, a bimodal polyethylene, was made utilizing Polymerization catalyst-1 as follows. Ethylene was copolymerized with 1-hexene in the first of two fluidized in-series bed reactors; no comonomer was utilized in the second of the of two fluidized in-series bed reactors. For Example 1, a high molecular weight polymer (in comparison to the second of the of two fluidized in-series bed reactors) was made in the first of the two fluidized in-series bed reactors and a low molecular weight polymer was made in the second of the two fluidized in-series bed reactors. Each polymerization was continuously conducted after equilibrium was reached under conditions set forth in Table I. Polymerization was initiated in the first reactor by continuously feeding the above catalyst precursor and cocatalyst TEA (trimethylaluminum) into a fluidized bed of polyethylene granules together with ethylene, 1-hexene, and hydrogen. The cocatalyst was first dissolved in isopentane. The resulting copolymer mixed with active catalyst was withdrawn from the first reactor and transferred to the second reactor using second reactor gas as a transfer medium. The second reactor also contains a fluidized bed of polyethylene granules. Ethylene and hydrogen are introduced into the second reactor where the gases come into contact with the polymer and catalyst from the first reactor. In the second reactor, the cocatalyst TEA is again introduced. Example 1 was continuously removed from the second reactor.

Example 2, Example 3, Example 4, Example 5, and Example 6 and were made as Example 1, with any changes indicated in Table 1. The polyolefin compositions of Inventive Examples 1 to 6 are bimodal polyethylene resins comprising a high molecular weight polyolefin constituent (made in the first polymerization reactor in-series) that is an ethylene/1-hexene copolymer and a low molecular weight polyolefin constituent (made in the second polymerization reactor in-series), where no direct feed comonomer was utilized.

TABLE 1

|  | Example 1 | Example 2 | Example 3 | Example 4 | Example 5 | Example 6 |
|---|---|---|---|---|---|---|
| Conditions for first in-series reactor | | | | | | |
| Reactor Temperature | 80° C. | 80° C. | 85° C. | 85° C. | 80° C. | 80° C. |
| H$_2$ to C$_2$ ratio (mol/mol) | 0.131 | 0.114 | 0.124 | 0.104 | 0.123 | 0.119 |
| C$_6$ to C$_2$ ratio (mol/mol) | 0.009 | 0.009 | 0.008 | 0.010 | 0.006 | 0.010 |
| Al to Ti ratio (mol/mol) | 9.9 | 8.5 | 9.5 | 9.0 | 9.5 | 7.2 |
| C$_2$ partial pressure (psi) | 34.9 | 33.7 | 31.0 | 29.9 | 35.6 | 39.8 |

TABLE 1-continued

| | Example 1 | Example 2 | Example 3 | Example 4 | Example 5 | Example 6 |
|---|---|---|---|---|---|---|
| Isopentane (mol %) | 9.9 | 10.0 | 9.8 | 9.8 | 9.7 | 10.0 |
| *Conditions for second in-series reactor* | | | | | | |
| Reactor Temperature | 100° C. | 100° C. | 100° C. | 100° C. | 100° C. | 100° C. |
| $H_2$ to $C_2$ ratio (mol/mol) | 1.00 | 1.40 | 1.39 | 1.80 | 1.78 | 1.00 |
| Al to Ti ratio (mol/mol) | 16.9 | 17.1 | 16.3 | 16.2 | 16.9 | 12.6 |
| $C_2$ partial pressure (psi) | 109.7 | 112.2 | 85.2 | 85.0 | 90.2 | 101.1 |
| Isopentane (mol %) | 8.7 | 7.9 | 9.1 | 10.1 | 10.0 | 5.0 |

Comparative Example A and Comparative Example B were made as Example 1, with any changes indicated in Table 2.

TABLE 2

| | Comparative Example A | Comparative Example B |
|---|---|---|
| *Conditions for first in-series reactor* | | |
| Reactor Temperature | 80° C. | 80° C. |
| $H_2$ to $C_2$ ratio (mol/mol) | 0.103 | 0.125 |
| $C_6$ to $C_2$ ratio (mol/mol) | 0.010 | 0.006 |
| Al to Ti ratio (mol/mol) | 14.3 | 11.2 |
| $C_2$ partial pressure (psi) | 33.1 | 43.0 |
| Isopentane (lmol %) | 14.3 | 11.2 |
| *Conditions for second in-series reactor* | | |
| Reactor Temperature | 100° C. | 110° C. |
| $H_2$ to $C_2$ ratio (mol/mol) | 1.79 | 1.80 |
| Al to Ti ratio (mol/mol) | 24.5 | 19.6 |
| $C_2$ partial pressure (psi) | 110.2 | 77.1 |
| Isopentane (mol %) | 5.0 | 10.1 |

A number of properties were determined for Examples 1-6 and Comparative Examples A-B. Also, a number of properties were determined for Comparative Example C (MARLEX HHM 5202BN; ethylene copolymer; obtained from Chevron Phillips); Comparative Example D (UNIVAL™ DMDA-6200; HDPE; obtained from The Dow Chemical Company); Comparative Example E (DOW 35060L; HDPE; obtained from The Dow Chemical Company); and Comparative Example F (CONTINUUM™ DMDD-6620; bimodal polyethylene; obtained from The Dow Chemical Company). The results are reported in Table 5, Table 6, Table 7, Table 8, and Table 9.

Density was determined according to ASTM D792.

Melt index ($I_2$, $I_5$, and $I_{21}$) was determined according to ASTM 1238. $I_2$ for the low molecular weight polyolefin was determined as follows. Ethylene was copolymerized with 1-hexene in a fluidized bed reactor. Multiple polymerizations (Runs 1 to 4) were carried out using different process conditions. Each polymerization was continuously conducted after equilibrium is reached, under the respective process conditions, as set forth in the tables (see Table 3) below. Polymerization was initiated by continuously feeding Polymerization catalyst-1, as described herein, and a cocatalyst dissolved in isopentane into a fluidized bed of polyethylene granules, together with ethylene, 1-hexene (when utilized) and hydrogen. Inert gases, nitrogen and isopentane, made up the remaining pressure in the reactor. The properties of the polyolefin samples made by these polymerizations were characterized (see Table 4) below. A model of this data was used to control the second in-series reactor providing the determined $I_2$.

TABLE 3

Single Reactor Polymerization Reaction Conditions

| | Run 1 | Run 2 | Run 3 | Run 4 |
|---|---|---|---|---|
| Temp. ° C. | 100 | 100 | 110 | 100 |
| Pressure, psig | 349 | 349 | 349 | 349 |
| $C_2$ Part. Pressure, psi | 100 | 90 | 90 | 90 |
| $H_2/C_2$ Molar Ratio | 1.0 | 1.78 | 1.80 | 1.78 |
| $C_6/C_2$ Molar Ratio | 0.000 | 0.000 | 0.000 | 0.002 |
| IC5% | 10.2 | 10.0 | 5.0 | 5.0 |
| Cat Feed Rate cc/hr | 4.6 | 5.1 | 6.3 | 5.4 |
| Cocatalyst | TEA | TEA | TEA | TEA |
| Cocatalyst Dilution (wt %) | 0.5 | 0.5 | 0.5 | 0.5 |
| Cocat. Feed Rate, cc/hr | 161 | 158 | 160 | 160 |
| Production Rate, lb/hr | 31.1 | 30.7 | 35.3 | 31.9 |
| Bed Weight, lbs | 142 | 145 | 113 | 132 |
| FBD(lb/ft³) | 17.5 | 16.9 | 13.0 | 16.0 |
| Bed Volume, ft³ | 8.1 | 8.6 | 8.7 | 8.2 |
| Residence Time, hr | 4.8 | 4.7 | 3.2 | 4.1 |

TABLE 4

Single Reactor Polymerization Resin Properties

| | Run 1 | Run 2 | Run 3 | Run 4 |
|---|---|---|---|---|
| Melt Index, g/10 min $I_2$ | 18.6 | 121.1 | 284.6 | 152.7 |
| Melt Index, g/10 min $I_5$ | 64.9 | 401.8 | 942.5 | 502.9 |

TABLE 4-continued

| Single Reactor Polymerization Resin Properties | | | | |
|---|---|---|---|---|
| | Run 1 | Run 2 | Run 3 | Run 4 |
| Flow Index, g/10 min $I_{21}$ | 774 | 4471 | n/a* | n/a* |
| Density, g/cm$_3$ | 0.9674 | 0.9705 | 0.9711 | 0.9675 |
| MFR ($I_{21}/I_2$) | 41.6 | 36.9 | n/a* | n/a* |
| MFR ($I_{21}/I_5$) | 11.9 | 11.1 | n/a* | n/a* |
| Residual Ti., ppm | 0.78 | 0.76 | 0.91 | 0.86 |
| Al/Ti molar ratio | 21.0 | 20.4 | 14.5 | 17.3 |
| Bulk Density, lb/ft$^3$ | 26.8 | 26.6 | 26.4 | 25.8 |
| APS, inches | 0.025 | 0.019 | 0.015 | 0.017 |
| Fines, Wt % LT 120 Mesh | 7.0 | 10.3 | 5.3 | 13.2 |

*$I_{21}$ values beyond the measurement capability of the instrument

An $I_2$ of 200 g/10 min is interpolated from Runs 1-4. An $I_2$ of 5 g/10 min is arrived at by a small extrapolation from Runs 1-4.

Cumulative detector fraction (CDF) was determined as discussed herein.

High molecular weight split was determined as follows. The molecular weight distribution of resins were measured by conventional gel permeation chromatography (GPC). The molecular weight distribution of the isolated HMW and LMW resins were overlaid upon the resin made with the in-series reactor system. The ratio of the HMW to LMW were adjusted so that the summation of the two distributions matched that of the measured in-series produced resin. For Examples 2 and 3 (in Table 5), where an isolated LMW resin was not produced in single reactor operation that was directly equivalent to the conditions used in those examples, then the split was determined using the density and $I_2$ models developed for the LMW reactors as well as resin property mixing models developed for prediction of final bimodal polymer properties.

Extrudate swell was determined as discussed herein.

ESCR $F_{50}$ was determined according to by ASTM D-1693, Method B, in 10% by volume aqueous Igepal CO-630 solution.

Weight average molecular weight ($M_w$(Conv)), number average molecular weight ($M_n$(Conv)), and Z-average molecular weight ($M_z$(Conv)) were determined by conventional gel permeation chromatography (GPC); the results are reported in Table 4.

Absolute weight average molecular weight ($M_w$(Abs)), absolute number average molecular weight ($M_n$(Abs)), and absolute Z-average molecular weight ($M_z$(Abs)) were determined by absolute gel permeation chromatography (GPC); the results are reported in Table 7.

G', where G"=3000 Pa, Eta (at 0.02 s$^{-1}$), and Eta (at 200 s$^{-1}$) were determined utilizing an ARES-G2 rheometer (manufactured by TA Instruments) and data was conducted via TA Instruments TRIOS software, as discussed herein.

Melt strength was determined as discussed herein.

Top load was determined as discussed herein.

TABLE 5

| | Density (HMW polyolefin made in first reactor) | Melt index ($I_{21}$) (HMW polyolefin made in first reactor) | Melt index ($I_2$) (LMW polyolefin) | HMW split |
|---|---|---|---|---|
| Inventive Example 1 | 0.9398 g/cm$^3$ | 0.83 g/10 min | 19 g/10 min | 40% |
| Inventive Example 2 | 0.9385 g/cm$^3$ | 0.57 g/10 min | 55 g/10 min | 42% |
| Inventive Example 3 | 0.9401 g/cm$^3$ | 1.13 g/10 min | 54 g/10 min | 47% |
| Inventive Example 4 | 0.9374 g/cm$^3$ | 0.83 g/10 min | 121 g/10 min | 48% |
| Inventive Example 5 | 0.9404 g/cm$^3$ | 0.85 g/10 min | 17 g/10 min | 48% |
| Inventive Example 6 | 0.9383 g/cm$^3$ | 0.62 g/10 min | 19 g/10 min | 45% |
| Comparative Example A | 0.9391 g/cm$^3$ | 0.81 g/10 min | 175 g/10 min | 51% |
| Comparative Example B | 0.9406 g/cm$^3$ | 0.84 g/10 min | 280 g/10 min | 50% |
| Comparative Example C | — | — | — | — |
| Comparative Example D | — | — | — | Unimodal |
| Comparative Example E | — | — | — | — |
| Comparative Example F | — | — | — | — |

| | $CDF_{LS}$ ≥10,00,000 MW | Swell (t1000) | Swell (t300) | ESCR $F_{50}$ |
|---|---|---|---|---|
| Inventive Example 1 | 0.090 | 7.00 s | 20.0 s | 141 h |
| Inventive Example 2 | 0.106 | 6.84 s | 19.7 s | 241 h |
| Inventive Example 3 | 0.115 | 6.67 s | 19.3 s | 168 h |
| Inventive Example 4 | 0.113 | 6.56 s | 18.5 s | 428 h |

TABLE 5-continued

| Inventive Example 5 | 0.105 | 6.67 s | 19.2 s | 229 h |
|---|---|---|---|---|
| Inventive Example 6 | 0.131 | 6.80 s | 20.0 s | 203 h |
| Comparative Example A | 0.063 | 6.29 s | 18.5 s | 320 h |
| Comparative Example B | 0.134 | 6.40 s | 18.9 s | 197 h |
| Comparative Example C | 0.015 | 8.00 s | — | 21 h |
| Comparative Example D | 0.010 | 7.42 s | 22.6 s | 20 h |
| Comparative Example E | 0.069 | 7.23 s | 20.5 s | 85 h |
| Comparative Example F | 0.012 | 5.73 s | 17.4 s | 150 h |

The data of Table 5 indicate that each of Inventive Examples 1-6 advantageously had a swell (t1000) greater than 6.5 seconds, and an ESCR $F_{50}$ greater than 140 hours. The data of Table 5 indicate that none of Comparative Examples A-F achieve the combination of a swell (t1000) greater than 6.5 seconds and an ESCR greater than 140 hours. The data of Table 5 indicate that each of Inventive Examples 1-6 desirably had a density from 0.9200 to 0.9450 g/cm$^3$ min for the HMW polyolefin made in the first in-series reactor. The data of Table 5 indicate that each of Inventive Examples 1-6 desirably had an $I_2$ from 5 to 200 g/10 min for the LMW polyolefin.

TABLE 6

|  | Density | Mn (Conv) g/mol | Mw (Conv) g/mol | Mz (Conv) g/mol | Mw/Mn |
|---|---|---|---|---|---|
|  |  | | Conventional GPC | | |
| Inventive Example 1 | 0.958 g/cm$^3$ | 14,887 | 266,877 | 3,145,157 | 17.9 |
| Inventive Example 2 | 0.959 g/cm$^3$ | 12,608 | 279,669 | 3,650,408 | 22.2 |
| Inventive Example 3 | 0.958 g/cm$^3$ | 12,942 | 266,465 | 3,361,970 | 20.6 |
| Inventive Example 4 | 0.957 g/cm$^3$ | 11,337 | 280,529 | 3,577,347 | 24.7 |
| Inventive Example 5 | 0.959 g/cm$^3$ | 11,482 | 292,802 | 3,830,429 | 25.5 |
| Inventive Example 6 | 0.957 g/cm$^3$ | 15,580 | 289,127 | 3,930,953 | 18.6 |
| Comparative Example A | 0.957 g/cm$^3$ | 11,014 | 257,351 | 2,783,573 | 23.4 |
| Comparative Example B | 0.958 g/cm$^3$ | 12,034 | 286,517 | 3,514,485 | 23.8 |
| Comparative Example D | 0.953 g/cm$^3$ | 13,165 | 129,449 | 962,930 | 9.8 |
| Comparative Example E | 0.959 g/cm$^3$ | 12,981 | 246,615 | 3,262,083 | 19.0 |
| Comparative Example F | 0.959 g/cm$^3$ | 13,452 | 203,881 | 1,330,396 | 15.2 |

|  | $I_2$ (modeled/ calculated) | $I_5$ | $I_{21}$ | $I_{21}/I_5$ |
|---|---|---|---|---|
| Inventive Example 1 | 0.2 g/10 min | 1.1 g/10 min | 25.3 g/10 min | 22.5 |
| Inventive Example 2 | 0.2 g/10 min | 1.0 g/10 min | 25.8 g/10 min | 27.1 |
| Inventive Example 3 | 0.2 g/10 min | 1.2 g/10 min | 28.8 g/10 min | 23.9 |
| Inventive Example 4 | 0.2 g/10 min | 1.0 g/10 min | 25.6 g/10 min | 26.4 |
| Inventive Example 5 | 0.2 g/10 min | 0.9 g/10 min | 26.7 g/10 min | 28.8 |
| Inventive Example 6 | 0.1 g/10 min | 0.7 g/10 min | 18.0 g/10 min | 25.0 |
| Comparative Example A | 0.2 g/10 min | 1.3 g/10 min | 23.3 g/10 min | 17.6 |
| Comparative Example B | 0.1 g/10 min | 0.8 g/10 min | 24.5 g/10 min | 30.9 |
| Comparative Example D | 0.4 g/10 min | 1.7 g/10 min | 34.3 g/10 min | 20.6 |
| Comparative Example E | 0.4 g/10 min | 1.7 g/10 min | 33.1 g/10 min | 19.8 |
| Comparative Example F | 0.3 g/10 min | 1.2 g/10 min | 26.9 g/10 min | 22.8 |

The data of Table 6 indicate that each of Inventive Examples 1-6 advantageously has a $M_w/M_n$ greater than 17. The data of Table 6 indicate that each of Inventive Examples 1-6 advantageously has an $I_{21}$ from $I_{15}$ to 40 g/10 min. The data of Table 6 indicate that each of Inventive Examples 1-6 advantageously has an $I_{21}/I_5$ greater than 22.

TABLE 7

|  | Mn (Abs) g/mol | Mw (Abs) g/mol | Mz (Abs) g/mol |
|---|---|---|---|
|  | | Absolute GPC | |
| Inventive Example 1 | 14,930 | 512,260 | 5,800,990 |
| Inventive Example 2 | 12,470 | 561,410 | 7,076,670 |
| Inventive Example 3 | 13,770 | 626,520 | 8,914,010 |
| Inventive Example 4 | 12,830 | 639,100 | 8,750,410 |
| Inventive Example 5 | 12,970 | 627,290 | 7,895,870 |
| Inventive Example 6 | 17,410 | 557,440 | 7,833,150 |
| Comparative Example A | 12,070 | 496,390 | 5,549,540 |
| Comparative Example B | 14,520 | 772,190 | 10,980,670 |
| Comparative Example D | 11,750 | 130,250 | 844,860 |
| Comparative Example E | 13,760 | 445,650 | 5,068,360 |
| Comparative Example F | 13,790 | 226,320 | 1,306,450 |

TABLE 8

| | G' (G" = 3000 Pa) | Eta (at 0.02 s$^{-1}$) | Eta (at 200 s$^{-1}$) | G'/G" (0.02 s$^{-1}$) | Equation 1 | Equation 2 |
|---|---|---|---|---|---|---|
| Inventive Example 1 | 1678 pa | 57,600 | 988 | 0.508 | 0.455 | 1496 |
| Inventive Example 2 | 1767 pa | 70,100 | 940 | 0.552 | 0.516 | 1573 |
| Inventive Example 3 | 1698 pa | 53,900 | 925 | 0.495 | 0.439 | 1499 |
| Inventive Example 4 | 1721 pa | 67,300 | 963 | 0.521 | 0.484 | 1561 |
| Inventive Example 5 | 1773 pa | 67,000 | 999 | 0.505 | 0.472 | 1597 |
| Inventive Example 6 | 1798 pa | 82,499 | 1090 | 0.580 | 0.514 | 1581 |
| Comparative Example A | 1647 pa | 60,202 | 936 | 0.493 | 0.454 | 1420 |
| Comparative Example B | 1884 pa | 78,500 | 940 | 0.580 | 0.534 | 1647 |

The data of Table 8 indicate that each of Inventive Examples 1-6 desirably has a G'/G" (0.02 s$^{-1}$) that is greater than the respective Equation 1, as previously discussed herein, value. The data of Table 8 indicate that each of Inventive Examples 1-6 desirably has a G'(G"=3000 Pa) that is greater than the respective Equation 2, as previously discussed herein, value.

TABLE 9

| | Melt strength (cN) | Top load (g) |
|---|---|---|
| Inventive Example 1 | 8.2 | 237 |
| Inventive Example 2 | 8.9 | 267 |
| Inventive Example 3 | 7.8 | — |
| Inventive Example 4 | 8.5 | — |
| Inventive Example 5 | 8.8 | 271 |
| Inventive Example 6 | 10.5 | |
| Comparative Example A | 8.4 | — |
| Comparative Example B | 9.9 | — |
| Comparative Example D | 10.3 | — |
| Comparative Example E | 6.8 | 172 |
| Comparative Example F | 6.9 | — |

The data of Table 9 indicate that each of Inventive Examples 1-6 desirably has a melt strength from 6.5 to 12.0 cN. The data of Table 9 indicate that each of Examples 1, 2, and 3 desirably have a top load greater than 200 grams.

What is claimed is:

1. A polyethylene composition comprising:
a first polyethylene having a density from 0.920 to 0.945 g/cm$^3$ wherein the first polyethylene is an ethylene/1-hexene copolymer that has a high load melt index (I$_{21}$) from 0.45 to 1.50 g/10 min.; and
a second polyethylene having an I$_2$ from 5 to 200 g/10 min,
wherein the polyethylene composition has a first polyethylene split of from 39 to 49 weight percent and a cumulative detector fraction (CDF$_{LS}$) at a molecular weight of ≥10,000,000 g/mol of greater than 0.085, further wherein the polyethylene composition exhibits one or more of:
(i) an absolute Z-average molecular weight (M$_z$(Abs)) from 3,500,000 to 12,000,000 g/mol; or
(ii) an absolute weight average molecular weight (M$_w$(Abs)) from 350,000 to 800,000 g/mol.

2. The polyethylene composition of claim 1, wherein the second polyethylene is a polyethylene homopolymer.

3. The polyethylene composition of claim 1, wherein the polyethylene composition provides an Environmental Stress Crack Resistance F$_{50}$ Condition B (10% IGEPAL) greater than 140 hours.

4. The polyethylene composition of claim 1, wherein the polyethylene composition provides a swell (t1000) greater than 6.5 seconds.

5. The polyethylene composition of claim 1,
wherein the polyethylene composition has a density from 0.930 to 0.970 g/cm$^3$, a M$_w$/M$_n$ greater than 17, a melt index (I$_{21}$) from 15 to 40 g/10 min, and
provides a G'/G" (0.02 s$^{-1}$) value that is greater than 0.3087+0.00404*(Eta at 0.02 s$^{-1}$)/(Eta at 200 s$^{-1}$)−0.224* first polyethylene Split, and
a G'(G"=3000 Pa) value from 1650 to 1870 Pa.

6. The polyethylene composition of claim 1, wherein the polyethylene composition provides a melt strength from 6.5 to 12.0 cN.

7. The polyethylene composition of claim 1, wherein the polyethylene composition has a weight Z-average molecular weight (M$_z$) from 1,500,000 to 5,500,000 g/mol.

8. The polyethylene composition of claim 1, having one or more of the following limitations:
(ii) wherein the first polyethylene has a density from 0.937 to 0.941 g/cm$^3$; and
(iii) wherein the second polyethylene has a melt index (I$_2$) from 16.5 to 129 g/10 min.

9. A method of making the polyethylene composition of claim 1, the method comprising polymerizing with a Ziegler-Natta catalyst ethylene and 1-hexene in a first fluidized bed reactor under first process conditions to make the first polyethylene containing the olefin polymerization catalyst, transferring the first polyethylene containing the olefin polymerization catalyst to a second fluidized bed reactor, which is in-series with the first fluidized bed reactor, and polymerizing ethylene in the second fluidized bed reactor under second process conditions so as to make the second polyethylene, wherein the first process conditions in the first fluidized bed reactor are configured for making the first polyethylene and the second process conditions in the second fluidized bed reactor are configured for making the second polyethylene, thereby making the polyethylene composition.

<div align="center">* * * * *</div>